United States Patent Office 3,522,125
Patented July 28, 1970

3,522,125
PROCESS OF BONDING A WOOD SUBSTRATE AND AN ETCHED SURFACE OF A POLYVINYLFLUORIDE FILM
John W. Talbott, Moscow, Idaho, and Murray N. Carroll, Ottawa, Ontario, Canada, assignors, by mesne assignments, to Mobil Oil Corporation, New York, N.Y., a corporation of New York
No Drawing. Filed Jan. 31, 1967, Ser. No. 612,773
Int. Cl. C09j 7/00
U.S. Cl. 156—313                                      5 Claims

ABSTRACT OF THE DISCLOSURE

Polyvinylfluoride film is bonded to a wood substrate with polyethylene and an organic peroxide cross-linking agent, to provide a tough protective surface.

BACKGROUND OF THE INVENTION

This invention relates to processes for bonding laminated products. It is more particularly concerned with the use of polyethylene as the adhesive in bonding polyvinylfluoride films to wood surfaces.

As is known to those skilled in the art, films of polyvinylfluoride have been proposed as a surface coating for wood surfaces, in order to protect the wood from the elements. The bonding of such films to the wood has been effected with adhesives, such as phenolic resins and epoxy resins. The resin adhesives, however, are relatively expensive and somewhat unreliable in this application.

SUMMARY OF THE INVENTION

It is the discovery of this invention that polyvinylfluoride film can be bonded to a wood substrate using as the binder polyethylene that has been surface-coated with an organic peroxide cross-linking agent.

In general, the present invention provides a method for producing laminated products that comprises placing between a treated surface of a polyvinylfluoride film and a wood substrate solid polyethylene and an organic peroxide cross-linking agent, and heating at elevated temperature and pressure for a period of time sufficient to effect a bond.

DESCRIPTION OF SPECIFIC EMBODIMENTS

The material that is bonded to the surface of a wood substrate, in accordance with this invention, is a film of polyvinylfluoride. This material, prepared by polymerizing vinylfluoride (monofluoroethylene), is readily available commercially in films. Normally it is transparent, but can be obtained pigmented. It is characterized by great toughness and excellent weather resistance. Depending upon the degree of surface protection desired, the film thickness can be between about 0.5 and about 5 mils thick.

In order to ensure firm bonds, it is desirable that the surface of the polyvinylfluoride facing the bond be surface treated or etched. Methods for treating the surface of films of polyvinylfluoride and polyolefins are well known in the art. Typical methods include chemical treatment, such as chlorination in the presence of ultraviolet light; electron bombardment; exposure to ultraviolet light; and radiation treatment. The particular method used for the surface treatment is not critical to this invention. In fact, polyvinylfluoride films are commercially available that have been surface treated by the manufacturer.

The bonding material contemplated herein is solid polyethylene that has been coated with an organic peroxide cross-linking agent. The polyethylene resin can be made by a number of processes well known in the art. Typical processes involve the use of metal halide catalysts, such as aluminum chloride and titanium chloride, metal halides, metal alkyls, etc. The method by which the polyethylene is produced is not, however, an important feature of this invention and it is not to be limited by any polymerization method. High density polyethylene (density=0.941—0.965) is preferred. For bonding purposes, the polyethylene can be applied in a finely-divided, powdered form. It is more preferable and feasible, however, to use one or more films of polyethylene. The film thickness can be between about 1.5 mils and about 12 mils and higher.

In accordance with this invention, the polyethylene bonding material is coated with an organic peroxide cross-linking agent. In the case of polyethylene film, the film can be sprayed with peroxide or dipped into a vessel containing the peroxide. Typical organic peroxides utilizable include dicumyl peroxide; di-t-amyl peroxide; 2,5-di(T-butylperoxy) hexyne-3; and 2,5-dimethyl-2,5-di(t-butylperoxy) hexane. The amount of organic peroxide used will be between about 0.5 percent and about 10 precent of the polyethylene weight, and preferably between about 2 and about 8 weight percent.

The wood substrates that can be overlaid or coated by the process of this invention are lumber, plywood, particleboard, and hardboard. The method is applicable also to overlaying fiberboards, paper, pasteboards, and other lignocellulosic or cellulosic materials which can stand temperatures as high as about 400° F.

In the preferred practice of the method of this invention, the surface of the wood substrate to be overlaid is covered with one or more films of polyethylene that is surface-coated with a suitable organic peroxide. On this is then placed the overlay polyvinylfluoride film that has been surface treated on the surface contacting the polyethylene. The assembly is placed in a heated mold or press. The heating can be at temperatures of between about 300° F. and about 450° F., preferably between about 350° F. and about 400° F. The time of heating can be between about one minute and about 30 minutes. Particularly suitable cycles are at 350° F. for 15 minutes and at 400° F. for 5 minutes. Pressures will be between about 10 p.s.i.g. and about 200 p.s.i.g. and higher, up to 1000 p.s.i.g.

The temperature at pressure release, to avoid blistering, depends upon the porosity of the substrate used. When very porous particleboards are used, pressure release can be at press temperature. When hardboards are used, pressure should not be released until the temperature has dropped to about 200° F. Release temperatures for lumber and plywoods fall intermediate of about 200° F. and full press temperature.

The ability to produce panel surfaces with a wide variety of desirable textures with the use of simple flat caul plates seems to be a valuable feature of the process of this invention. The anticipated use of the product is in applications in which a wood substrate can be formed into a product having a pleasing texture yet having a polyvinylfluoride surface which is highly weather resistant and protects the wood surface from attack by atmospheric elements. If a fairly thick polyethylene layer is used, it penetrates and reinforces the outer surfaces of the substrate, so that the resultant product is more immune to damage resulting from puncture of the protective polyvinylfluoride film. In essence, the polyvinylfluoride film is the first line of defense; beneath this is another moisture-impermeable film of hardened polyethylene which is protected by the polyvinylfluoride outer film from attack by ultraviolet light.

EXAMPLE

On the surface of a sheet of Douglas fir plywood was placed a 1.5-mils polyethylene film, that was surface-coated with 5 weight percent of 2,5-di(t-butylperoxy) hexyne-3. Then, there was placed, on the coated polyethylene film, a 1.5-mils film of poly(monofluoroethylene), that had been surface treated by electron bombardment by the manufacturer, with the treated surface contacting the polyethylene film. The resulting assembly was hot pressed at 350° F. for 15 minutes, at 60 p.s.i.g. The press temperature was reduced to about 200° F. before removing the coated plywood product. When an effort was made to strip off the poly(monofluoroethylene) film, surface wood was removed, instead, along with the poly(monofluoroethylene)-polyethylene film composite.

Although the present invention has been described with preferred embodiments, it is to be understood that modifications and variations may be resorted to, without departing from the spirit and scope of this invention, as those skilled in the art will readily appreciate. Such variations and modifications are considered to be within the purview and scope of the appended claims.

We claim:

1. A method for producing a laminated product that comprises placing solid polyethylene coated with an organic peroxide cross-linking agent between a wood substrate and an etched surface of a polyvinylfluoride film, and heating at elevated temperature and pressure for a time sufficient to effect a bond.

2. The method defined in claim 1, wherein said wood substrate is plywood.

3. The method defined in claim 1, wherein said wood substrate is fir plywood.

4. The method defined in claim 1, wherein said temperature is between about 300° F. and about 450° F., said pressure is between about 10 p.s.i.g. and about 1000 p.s.i.g., and said period of time is between about one minute and about 30 minutes.

5. The method defined in claim 2, wherein said temperature is between about 300° F. and about 450° F., said pressure is between about 10 p.s.i.g. and about 1000 p.s.i.g., and said period of time is between about one minute and about 30 minutes.

References Cited

UNITED STATES PATENTS

| | | | |
|---|---|---|---|
| 2,635,975 | 4/1953 | Peters | 156—334 X |
| 2,758,953 | 8/1956 | Cottle et al. | 156—334 X |
| 3,024,813 | 3/1962 | Sear et al. | |
| 3,079,295 | 2/1963 | Slotterbeck et al. | 156—334 |
| 3,099,293 | 7/1963 | Lakritz et al. | 156—334 X |
| 3,228,823 | 1/1966 | Usala et al. | 161—186 |
| 3,345,247 | 10/1967 | Mahar et al. | 161—247 |
| 3,406,732 | 10/1968 | Milano et al. | 156—334 X |

CARL D. QUARFORTH, Primary Examiner

S. J. LECHERT, JR., Assistant Examiner

U.S. Cl. X.R.

156—3, 334; 117—138.8; 161—189, 270